(12) United States Patent
Feng et al.

(10) Patent No.: US 10,769,407 B2
(45) Date of Patent: Sep. 8, 2020

(54) FINGERPRINT REGISTRATION METHOD AND DEVICE

(71) Applicant: Tsinghua University, Beijing (CN)

(72) Inventors: Jianjiang Feng, Beijing (CN); Jie Zhou, Beijing (CN); Shihao Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 493 days.

(21) Appl. No.: 15/669,910

(22) Filed: Aug. 5, 2017

(65) Prior Publication Data

US 2018/0285618 A1    Oct. 4, 2018

Related U.S. Application Data

(63) Continuation of application No. PCT/CN2017/080828, filed on Apr. 17, 2017.

(30) Foreign Application Priority Data

Mar. 31, 2017   (CN) .......................... 2017 1 0210304

(51) Int. Cl.
*G06K 9/00*    (2006.01)
(52) U.S. Cl.
CPC .......... *G06K 9/0008* (2013.01); *G06K 9/001* (2013.01); *G06K 9/00926* (2013.01)
(58) Field of Classification Search
CPC ........ G06K 9/0008; G06K 9/001; G06K 9/00; G06K 9/00114; G06K 9/00134; G06K 9/00926; G06K 2209/00
(Continued)

(56) References Cited

U.S. PATENT DOCUMENTS

2012/0014570 A1* 1/2012 Abe ................... G06K 9/00067
382/124
2013/0094724 A1    4/2013 Al-Zahrani et al.
(Continued)

FOREIGN PATENT DOCUMENTS

| CN | 101751555 A | 6/2010 |
| CN | 101777128 A | 7/2010 |
| CN | 105740753 A | 7/2016 |

OTHER PUBLICATIONS

Ito et al., "A Fingerprint Recognition Algorithm Combining Phase-Based Image Matching and Feature-Based Matching," International Conference on Biometrics, 2006, pp. 316-325.
(Continued)

*Primary Examiner* — Dwayne D Bost
*Assistant Examiner* — Stephen M Brinich
(74) *Attorney, Agent, or Firm* — Hodgson Russ LLP

(57) ABSTRACT

Embodiments of the present disclosure provide a fingerprint registration method and device. The method includes: obtaining a fingerprint to be registered and a target fingerprint, extracting fingerprint features from the fingerprint to be registered and the target fingerprint, in which the fingerprint features include a ridge feature and a phase feature, performing a rough registration using ridge features of the two fingerprints, and then obtaining phase difference information of phase features of the two fingerprints in a phase overlap region, adjusting the rough registration result according to the phase difference information to obtain a final registration result of the two fingerprints. In some embodiments, it does not simply depend on the ridge feature to perform the fingerprint registration and add the phase feature on the basis of the ridge feature, and perform twice registration, thereby improving the accuracy of fingerprint registration.

16 Claims, 7 Drawing Sheets

(58) Field of Classification Search
USPC .................. 382/124–128, 151, 293–297
See application file for complete search history.

(56) References Cited

U.S. PATENT DOCUMENTS

2014/0301615 A1* 10/2014 Yamada ............. G06K 9/00073
  382/125
2018/0089484 A1* 3/2018 Satou .................... A61B 5/117

OTHER PUBLICATIONS

SIPO, First Office Action for CN Application No. 201710210304, dated Apr. 18, 2019.

* cited by examiner first ridge feature

FINGERPRINT REGISTRATION METHOD AND DEVICE

CROSS-REFERENCE TO RELATED APPLICATION

This application is a continuation of International Application No. PCT/CN2017/080828, filed Apr. 17, 2017, which claims priority to and benefits of Chinese Patent Application No. 201710210304.4, filed Mar. 31, 2017, the entire contents of which are incorporated herein by reference.

FIELD

The present disclosure relates to information processing fields, and more particularly to a fingerprint registration method and device.

BACKGROUND

As fingerprint has characteristics of stability, high distinction degree and easy collection, it is widely applied in criminal investigation, access control, attendance check and device unlock. In these applications, the fingerprint may be identified automatically. Currently, automatic fingerprint identification technology is measured by recognition rate. When qualities of a pair of collected fingerprints are high, it may be accurately determined whether the two fingerprints come from the same finger through the automatic fingerprint identification technology in the related art.

However, in practical applications, a fingerprint collection device has a two-dimensional collection plane, while human fingers are elastic and three-dimensional. The collected fingerprint may produce a large distortion if the finger is pressed on the plane unevenly or laterally, thereby causing changes on the frequency and the curvature of ridges and the positions and the directions of minutiae of the collected fingerprint.

SUMMARY

Embodiments of the present disclosure provide a fingerprint registration method, including:

obtaining a fingerprint to be registered and a target fingerprint;

extracting features from the fingerprint to be registered and the target fingerprint to obtain a first fingerprint feature of the fingerprint to be registered and a second fingerprint feature of the target fingerprint, in which, the first fingerprint feature includes a first ridge feature and a first phase feature; the second fingerprint feature includes a second ridge feature and a second phase feature;

performing a rough registration on the fingerprint to be registered and the target fingerprint according to the first ridge feature and the second ridge feature to obtain a rough registration result;

obtaining phase difference information of a phase overlap region between the first phase feature and the second phase feature; and adjusting the rough registration result according to the phase difference information to obtain a final registration result of the fingerprint to be registered and the target fingerprint.

Embodiments of the present disclosure further provide a fingerprint registration device, including:

a memory, a processor, and a program stored in the memory and executable by the processor, in which the processor is configured to perform the fingerprint registration method according to the embodiments of the present disclosure.

In addition, embodiments of the present disclosure further provide a non-transitory computer readable storage medium. When instructions of the storage medium are executed by a server-side processor, the server-side can execute a fingerprint registration method, and the method includes:

extracting features from the fingerprint to be registered and the target fingerprint to obtain a first fingerprint feature of the fingerprint to be registered and a second fingerprint feature of the target fingerprint, in which the first fingerprint feature includes a first ridge feature and a first phase feature; the second fingerprint feature includes a second ridge feature and a second phase feature;

performing a rough registration on the fingerprint to be registered and the target fingerprint according to the first ridge feature and the second ridge feature to obtain a rough registration result;

obtaining phase difference information of a phase overlap region between the first phase feature and the second phase feature; and adjusting the rough registration result according to the phase difference information to obtain a final registration result of the fingerprint to be registered and the target fingerprint.

Furthermore, embodiments of the present disclosure provide a computer program product. When instructions of the computer program product are executed by the processor, the processor executes a fingerprint registration method, including:

extracting features from the fingerprint to be registered and the target fingerprint to obtain a first fingerprint feature of the fingerprint to be registered and a second fingerprint feature of the target fingerprint, in which the first fingerprint feature includes a first ridge feature and a first phase feature; the second fingerprint feature includes a second ridge feature and a second phase feature;

performing a rough registration on the fingerprint to be registered and the target fingerprint according to the first ridge feature and the second ridge feature to obtain a rough registration result;

obtaining phase difference information of a phase overlap region between the first phase feature and the second phase feature; and adjusting the rough registration result according to the phase difference information to obtain a final registration result of the fingerprint to be registered and the target fingerprint.

Additional aspects and advantages of embodiments of the present disclosure will be given in part in the following descriptions, and become apparent in part from the following descriptions, or be learned from the practice of the embodiments of the present disclosure.

BRIEF DESCRIPTION OF THE DRAWINGS

In order to clearly illustrate embodiments of the present disclosure or technical solutions in the prior art, a brief description of drawings used in embodiments or in the prior art descriptions is given below. Obviously, the drawings in the following descriptions are only part embodiments of the present disclosure, and for those skilled in the art, other drawings can be obtained according to these drawings without creative labor.

DETAILED DESCRIPTION

Combining with drawings in the embodiments of the present disclosure, reference will be made clearly and completely to technical solutions in the embodiments of the present disclosure. Obviously, the embodiments described here are only part of the embodiments of the present disclosure and not all embodiments of the present disclosure. According to the embodiments of the present disclosure, other embodiments obtained by those skilled in the art without creative labor are within scope of the present disclosure.

A fingerprint registration method and device of embodiments of the present disclosure is described below with reference to drawings.

Figure 1:
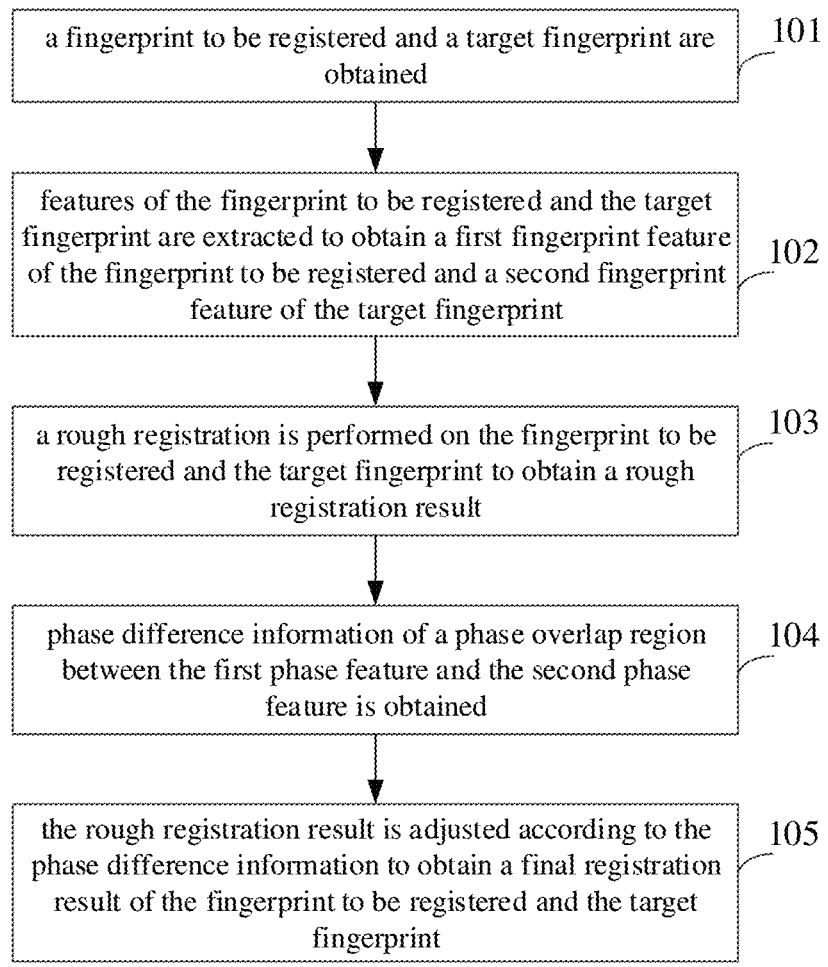
FIG. 1 is a flow chart of a fingerprint registration method according to an embodiment of the present disclosure.

FIG. 1 is a flow diagram of a fingerprint registration method according to an embodiment of the present disclosure. As illustrated in FIG. 1, the fingerprint registration method includes the following blocks.

S101, a fingerprint to be registered and a target fingerprint are obtained.

Specifically, the fingerprint to be registered may be collected by a fingerprint collection device. The target fingerprint is a fingerprint that is pre-collected and stored in a fingerprint database. The fingerprint to be registered and the target fingerprint can come from the same finger, and can also come from different fingers. In some embodiments, the fingerprint registration method is explained by taking fingerprints coming from the same finger as the target fingerprint. Certainly, the fingerprint to be registered can be registered with any fingerprint in the fingerprint database.

For example, when using fingerprints to check attendance, there are a plurality of fingerprints stored on the attendance machine. When attendance of an employee is checked, he/she can input his/her fingerprint on the attendance machine, and the inputted fingerprint is the fingerprint to be registered. All fingerprints stored on the attendance machine need to be matched with the fingerprint to be registered, and any fingerprint on the attendance machine can be used as the target fingerprint in this case.

S102, features of the fingerprint to be registered and the target fingerprint are extracted to obtain a first fingerprint feature of the fingerprint to be registered and a second fingerprint feature of the target fingerprint.

The first fingerprint feature includes a first ridge feature and a first phase feature, and the second fingerprint feature includes a second ridge feature and a second phase feature.

In some embodiments, after obtaining the fingerprint to be registered and the target fingerprint, the features of the fingerprint to be registered and the target fingerprint can be extracted to obtain the first fingerprint feature of the fingerprint to be registered and the second fingerprint feature of the target fingerprint. The first fingerprint feature includes the first ridge feature and the first phase feature, and the second fingerprint feature includes the second ridge feature and the second phase feature.

In some embodiments, the ridge feature of fingerprint can include a direction field of fingerprint and a periodogram of fingerprint. In at least one embodiment, the ridge feature of fingerprint can include a direction field of fingerprint, a periodogram of fingerprint and minutiae of fingerprint.

Specifically, the fingerprint to be registered is calculated using an image gray scale gradient algorithm to obtain the direction field of the fingerprint to be registered, and the target fingerprint is calculated using an image gray scale gradient algorithm to obtain the direction field of the target fingerprint. Further, the fingerprint to be registered is estimated using an average distance between adjacent peaks in a region to obtain the periodogram of the fingerprint to be registered, and the target fingerprint is estimated using an average distance between adjacent peaks in a region to obtain the periodogram of the target fingerprint. Further, the minutiae of the fingerprint to be registered are extracted from the fingerprint to be registered using a thinning image, and the minutiae of the target fingerprint are extracted from the target fingerprint using a thinning image. The first ridge feature of the fingerprint to be registered and the second ridge feature of the target feature can be obtained through the above feature extraction.

Figure 2:
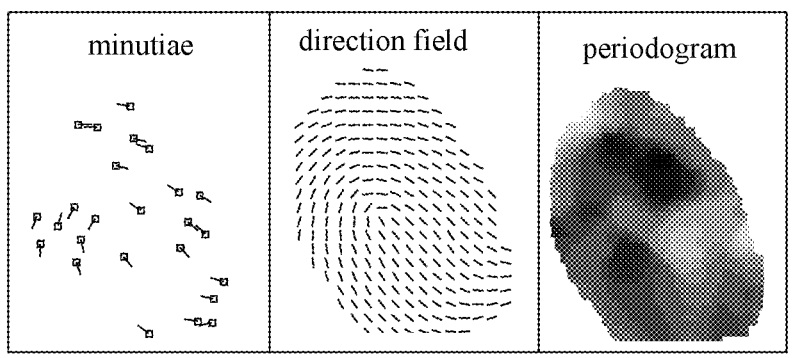
FIG. 2 is a schematic diagram of a first ridge feature according to an embodiment of the present disclosure.
Figure 3:
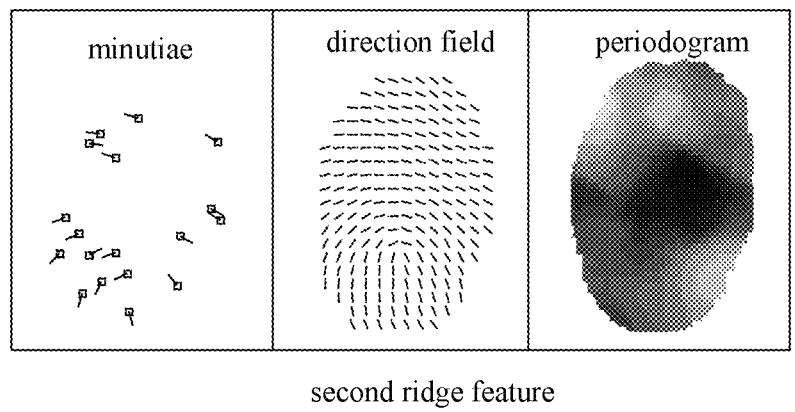
FIG. 3 is a schematic diagram of a second ridge feature according to an embodiment of the present disclosure.

FIG. 2 is a schematic diagram of a first ridge feature according to an embodiment of the present disclosure. FIG. 3 is a schematic diagram of a second ridge feature according to an embodiment of the present disclosure. The first ridge feature includes a direction field, a periodogram and minutiae of the fingerprint to be registered, and the second ridge feature includes a direction field, a periodogram and minutiae of the target fingerprint.

Figure 4:
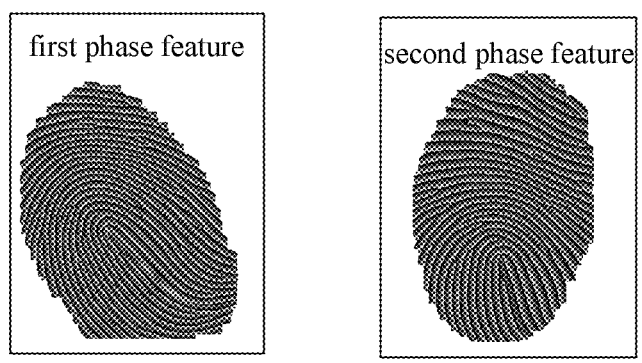
FIG. 4 is a schematic diagram of a first phase feature and a second phase feature according to an embodiment of the present disclosure.

Further, a preset band pass filter can be used to extract the first phase feature of the fingerprint to be registered and the second phase feature of the target fingerprint, alternatively, the band pass filter can be a two-dimensional complex Gabor filter. Specifically, the fingerprint to be registered and the target fingerprint are inputted into the preset band pass filter, for example the complex Gabor filter respectively to obtain a first filtered fingerprint of the fingerprint to be registered and a second filtered fingerprint of the target fingerprint. After obtaining the first filtered fingerprint and the second filtered fingerprint, a four quadrant arc tangent operation is applied to a first intermediate fingerprint and a second intermediate fingerprint to obtain the first phase feature of the fingerprint to be registered and the second phase feature of the target fingerprint. FIG. 4 is a schematic diagram of a first phase feature and a second phase feature according to an embodiment of the present disclosure.

When the complex Gabor filter is used to extract phase feature of fingerprint, it is required to set frequency and direction parameters of the complex Gabor filter using frequency and direction of ridge of fingerprint corresponding to the current position of the complex Gabor filter. The mathematical expression of the two-dimensional complex Gabor filter is given by $$G(x, y:x_0, y_0) = e^{2\pi i x_\theta/P(x_0,y_0)} e^{-\left(\frac{x_\theta^2}{2\sigma_x^2}+\frac{y_\theta^2}{2\sigma_y^2}\right)},$$

$$x_\theta = x\cos\left(O(x_0, y_0)+\frac{\pi}{2}\right) - y\sin\left(O(x_0, y_0)+\frac{\pi}{2}\right),$$

$$y_\theta = y\sin\left(O(x_0, y_0)+\frac{\pi}{2}\right) + y\cos\left(O(x_0, y_0)+\frac{\pi}{2}\right),$$

where, x,y are a horizontal coordinate and a vertical coordinate of any point in the filter, respectively, and taking values of x,y of the point into the above expression, a value of the complex Gabor filter at that point can be obtained.

$x_0$, $y_0$ are a horizontal coordinate and a vertical coordinate of a point corresponding to the center of the filter in fingerprint;

$x_\theta$, $y_\theta$ are a horizontal coordinate and a vertical coordinate of point (x,y) after rotation in the filter; in which, θ is just a sign and can be replaced with another sign.

$\sigma_x$ and $\sigma_y$ are a standard deviation of a two-dimensional Gaussian function in horizontal direction and vertical direction, respectively;

$P(x_0,y_0)$ is a value of the periodogram of fingerprint at position $(x_0,y_0)$ and $O(x_0,y_0)$ is a value of the direction field of fingerprint at position $(x_0,y_0)$.

After filtering the fingerprint using the two-dimensional complex Gabor filter, a filtered fingerprint is obtained, and the phase feature of fingerprint can be extracted from the filtered fingerprint. The phase feature is calculated according to a formula of $$\Phi = a\tan 2(Im[I*G], Re[I*G])$$

where, a tan 2(•) is the four quadrant arc tangent operation, Im[z] and Re[z] are an imaginary part and a real part of a complex signal Z.

S103, a rough registration is performed on the fingerprint to be registered and the target fingerprint to obtain a rough registration result.

Specifically, after obtaining the first ridge feature of the fingerprint to be registered and the second ridge feature of the target fingerprint, a first deformation model of the fingerprint to be registered with respect to the target fingerprint can be fitted according to the first ridge feature and the second ridge feature. Further, a first distorted field of the fingerprint to be registered with respect to the target fingerprint can be obtained according to the first deformation model, and then the fingerprint to be registered is deformed according to the first distortion field, and the rough registration is performed on the deformed fingerprint to be registered and the target fingerprint to obtain the rough registration result of the fingerprint to be registered and the target fingerprint.

In some embodiments, when the ridge feature of fingerprint only includes a direction field of fingerprint and a periodogram of fingerprint, the first deformation model fitted according to the first ridge feature and the second ridge feature is a rigid deformation model. When the ridge feature of fingerprint includes a direction field of fingerprint, a periodogram of fingerprint and minutiae of fingerprint, the first deformation model fitted according to the first ridge feature and the second ridge feature is an elastic deformation model.

S104, phase difference information of a phase overlap region between the first phase feature and the second phase feature is obtained.

After obtaining the first phase feature and the second phase, the first phase feature is deformed first using the first deformation model, and the registration is performed on the deformed first phase feature and the second phase feature to obtain the phase overlap region between the first phase feature and the second phase feature.

Figure 5:
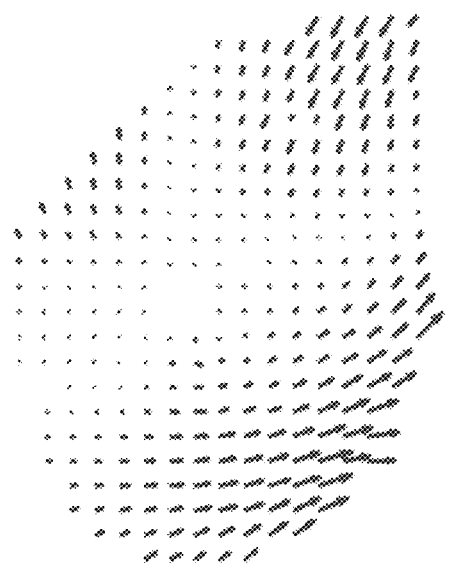
FIG. 5 is a schematic diagram of phase difference information according to an embodiment of the present disclosure.

Further, a subtraction is performed directly on the first phase feature and the second phase feature of the phase overlap region to obtain an original phase difference of the phase overlap region, and then a phase unwrapping is applied to the original phase difference of the phase overlap region to obtain the phase difference information of the phase overlap region. The phase difference information includes phase difference of each pixel in the phase overlap region. FIG. 5 is a schematic diagram of phase difference information according to an embodiment of the present disclosure. A deformation vector of a certain point of the fingerprint to be registered with respect to the respective point in the target fingerprint can be represented by an arrow direction and an arrow length in FIG. 5.

In at least one embodiment, the first phase feature is deformed using the first deformation model, a phase unwrapping is applied to the deformed first phase feature and the second phase feature to obtain a third phase feature and a fourth phase feature, and then a registration is performed on the third phase feature and the fourth phase feature to obtain a phase overlap region between the third phase feature and the fourth phase feature. Further, a subtraction is performed on the third phase feature and the fourth phase feature of the phase overlap region to obtain the phase difference information between the third phase feature and the fourth phase feature.

In practical applications, the phase unwrapping is related to path, and different unwrapping paths may lead to different unwrapping results. Therefore, the phase difference information obtained by only once phase unwrapping operation may have more robust and higher efficiency.

S105, the rough registration result is adjusted according to the phase difference information to obtain a final registration result of the fingerprint to be registered and the target fingerprint.

In some embodiments, a second deformation model of the fingerprint to be registered with respect to the target fingerprint is calculated according to the phase difference information. Specifically, a deformation vector of a first point set of the fingerprint to be registered with respect to a second point set of the target fingerprint of the phase overlap region is obtained according to the phase difference information, the direction field of the target fingerprint and the periodogram of the target fingerprint in the second ridge feature.

The first point set includes all pixel points of the fingerprint to be registered in the phase overlap region, the second point set includes respective points in the target fingerprint corresponding to the first point set, the deformation vector includes a deformation strength and a deformation direction, and the deformation vector is decomposable into a first deformation vector in a horizontal direction and a second deformation vector in a vertical direction.

The deformation strength in the first deformation vector is calculated according to a formula of $$D_x(x, y) = \frac{\Delta\Phi_U(x, y)}{2\pi/P_R(x, y)}\cos\left(O_R(x, y) + \frac{\pi}{2}\right);$$

the deformation strength in the second deformation vector is calculated according to a formula of $$D_y(x, y) = \frac{\Delta\Phi_U(x, y)}{2\pi/P_R(x, y)}\sin\left(O_R(x, y) + \frac{\pi}{2}\right);$$

where, $D_x(x,y)$ is the deformation strength in the horizontal direction of a pixel point at position (x,y) in the first point set of the fingerprint to be registered with respect to a corresponding pixel point in the second point set;

$D_y(x,y)$ is the deformation strength in the vertical direction of a pixel point at position (x,y) in the first point set of the fingerprint to be registered with respect to a corresponding pixel point in the second point set;

$\Delta\Phi_U(x,y)$ is the phase difference information at position (x,y);

$P_R(x,y)$ is a value of the periodogram of the target fingerprint at position (x,y); and $O_R(x,y)$ is a value of the direction field of the target fingerprint at position (x,y).

In practical applications, the collected fingerprints may be of low quality or have strong background noise at some positions, which results in a large deviation between the obtained deformation vectors at some positions and the deformation vectors of corresponding surrounding regions, while under normal circumstances, deformation vectors within the same region should be roughly the same or similar. In order to improve accuracy of fingerprint registration, it is required to filter out these abnormal deformation vectors.

After obtaining the first deformation vector and the second deformation vector of each pixel point of the fingerprint to be registered in the phase overlap region, the noise points of the first point set can be filtered out according to the first deformation vector and the second deformation vector to obtain a third point set of the fingerprint to be registered in the phase overlap region.

Further, a fourth point set of the target fingerprint can be obtained from the second point set according to the third point set. Specifically, a pixel point is selected arbitrarily from the third point set, and a pixel point in the target fingerprint corresponding to the pixel point is determined according to the position of the pixel point and the deformation vector corresponding to the position.

When all points in the third point are set, points corresponding to their own but belonging to the target fingerprint are determined, and the fourth point set may be defined according to these determined points belonging to the target fingerprint.

Further, a fitting is performed using the third point set and the fourth point set to obtain the second deformation model. The second deformation model may be a fitting function such as a polynomial model, a B-spline model or a thin plate spline (TPS) model. Alternatively, the third point set and the fourth point set can be sampled according to a preset sampling interval, and a fitting is performed using a sampled third point and a sampled fourth point set to obtain the second deformation model. Alternatively, the sampling interval can be 15 pixels.

Further, because $D_x$ and $D_y$ are floating numbers, the registration accuracy of fingerprint can reach sub-pixel level. Moreover, the distortion in some embodiments is flat, that is, the deformation strength is not strong enough in a small neighborhood. Therefore, the efficiency of the algorithm can be improved by evenly sampling $D_x$ and $D_y$ in the horizontal direction and the vertical direction without significant loss of accuracy.

After obtaining the second deformation model, a second distortion field of the fingerprint to be registered with respect to the target fingerprint can be determined using the second deformation model, and then the fingerprint to be registered in the rough registration result is deformed using the second distortion field to obtain the final registration result.

With the fingerprint registration method according to embodiments of the present disclosure, the fingerprint features may be extracted from the fingerprint to be registered and the target fingerprint, in which the fingerprint features include the ridge feature and the phase feature, the rough registration is performed using the ridge features of the two fingerprints, and then the phase difference information of the phase features of the two fingerprints in the phase overlap region is obtained, and the rough registration result is adjusted according to the phase difference information to obtain the final registration result of the two fingerprints. In some embodiments, it does not simply depend on the ridge feature to perform the fingerprint registration and add the phase feature on the basis of the ridge feature, and perform twice registration, thereby improving the accuracy of fingerprint registration.

Figure 6:
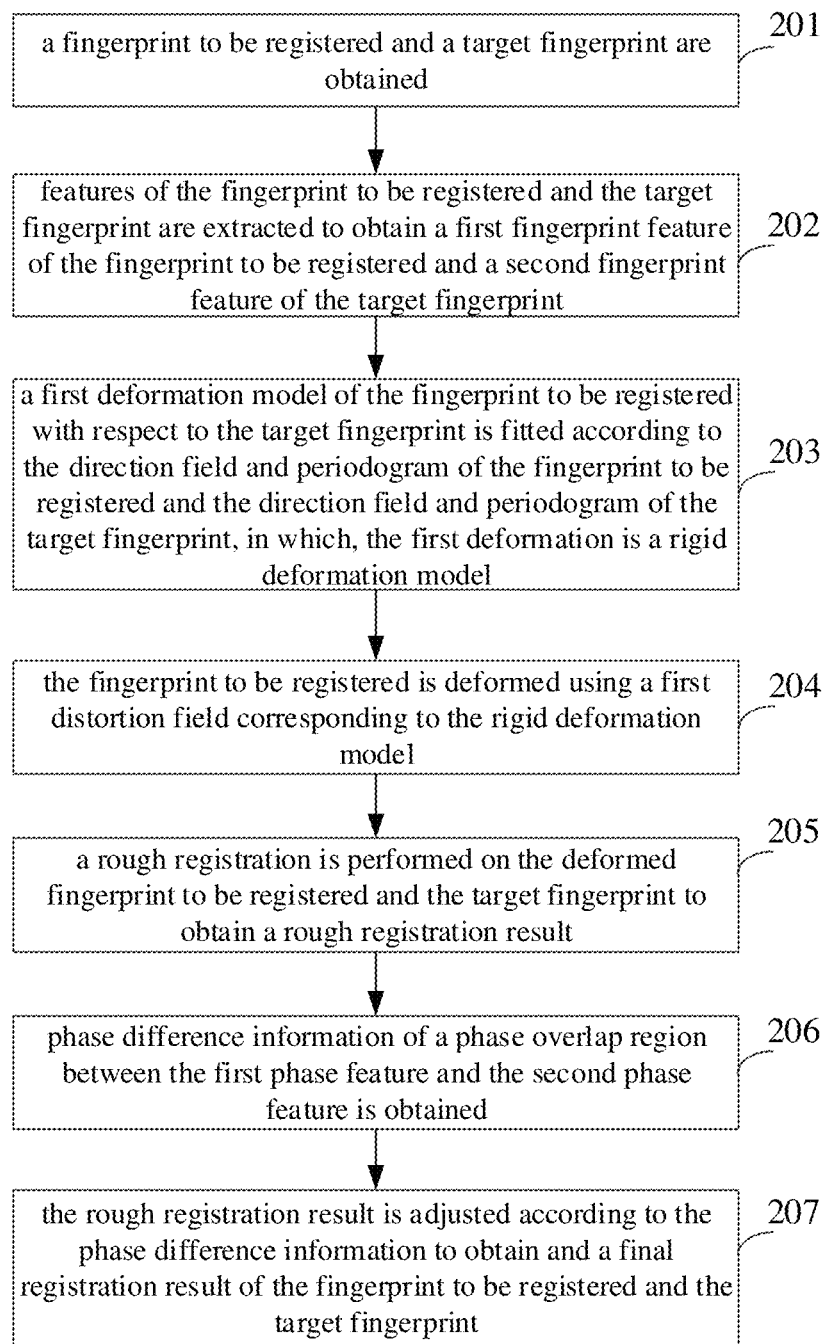
FIG. 6 is a flow chart of another fingerprint registration method according to an embodiment of the present disclosure.

FIG. 6 is a flow diagram of another fingerprint registration method according to an embodiment of the present disclosure. As illustrated in FIG. 6, the fingerprint registration method includes the following blocks.

S201, a fingerprint to be registered and a target fingerprint are obtained.

S202, features of the fingerprint to be registered and the target fingerprint are extracted to obtain a first fingerprint feature of the fingerprint to be registered and a second fingerprint feature of the target fingerprint.

The first fingerprint feature includes a first ridge feature and a first phase feature, and the second fingerprint feature includes a second ridge feature and a second phase feature. In some embodiments, the first ridge feature includes a direction field and a periodogram of the fingerprint to be registered, and the second ridge feature includes a direction field and a periodogram of the target fingerprint.

The specific process of extracting the features can refer to related descriptions in the above embodiments, and descriptions thereof will be omitted.

S203, a first deformation model of the fingerprint to be registered with respect to the target fingerprint is fitted according to the direction field and the periodogram of the fingerprint to be registered and the direction field and the periodogram of the target fingerprint, in which, the first deformation is a rigid deformation model.

Specifically, the direction field and the periodogram of the fingerprint to be registered and the direction field and the periodogram of the target fingerprint may be analyzed, an optimum rotation and translation parameter of the fingerprint to be registered with respect to the target fingerprint may be obtained, and then the first deformation model is fitted using the optimum rotation and translation parameter.

S204, the fingerprint to be registered is deformed using a first distortion field corresponding to the rigid deformation model.

After obtaining the rigid deformation model, the first distortion field corresponding to the rigid deformation model can be calculated, and then the fingerprint to be registered is deformed using the first distortion field. For example, the fingerprint to be registered can be rotated and translated according to the first distortion model.

S205, a rough registration is performed on the deformed fingerprint to be registered and the target fingerprint to obtain a rough registration result.

S206, phase difference information of a phase overlap region between the first phase feature and the second phase feature is obtained.

S207, the rough registration result is adjusted according to the phase difference information to obtain a final registration result of the fingerprint to be registered and the target fingerprint.

The detailed descriptions of S205 to S207 can refer to related descriptions in the above embodiments, and descriptions thereof will be omitted.

In some embodiment, it does not simply depend on the ridge feature to perform the fingerprint registration and add the phase feature on the basis of the ridge feature, and perform twice registration, thereby improving the accuracy of fingerprint registration.

Figure 7:
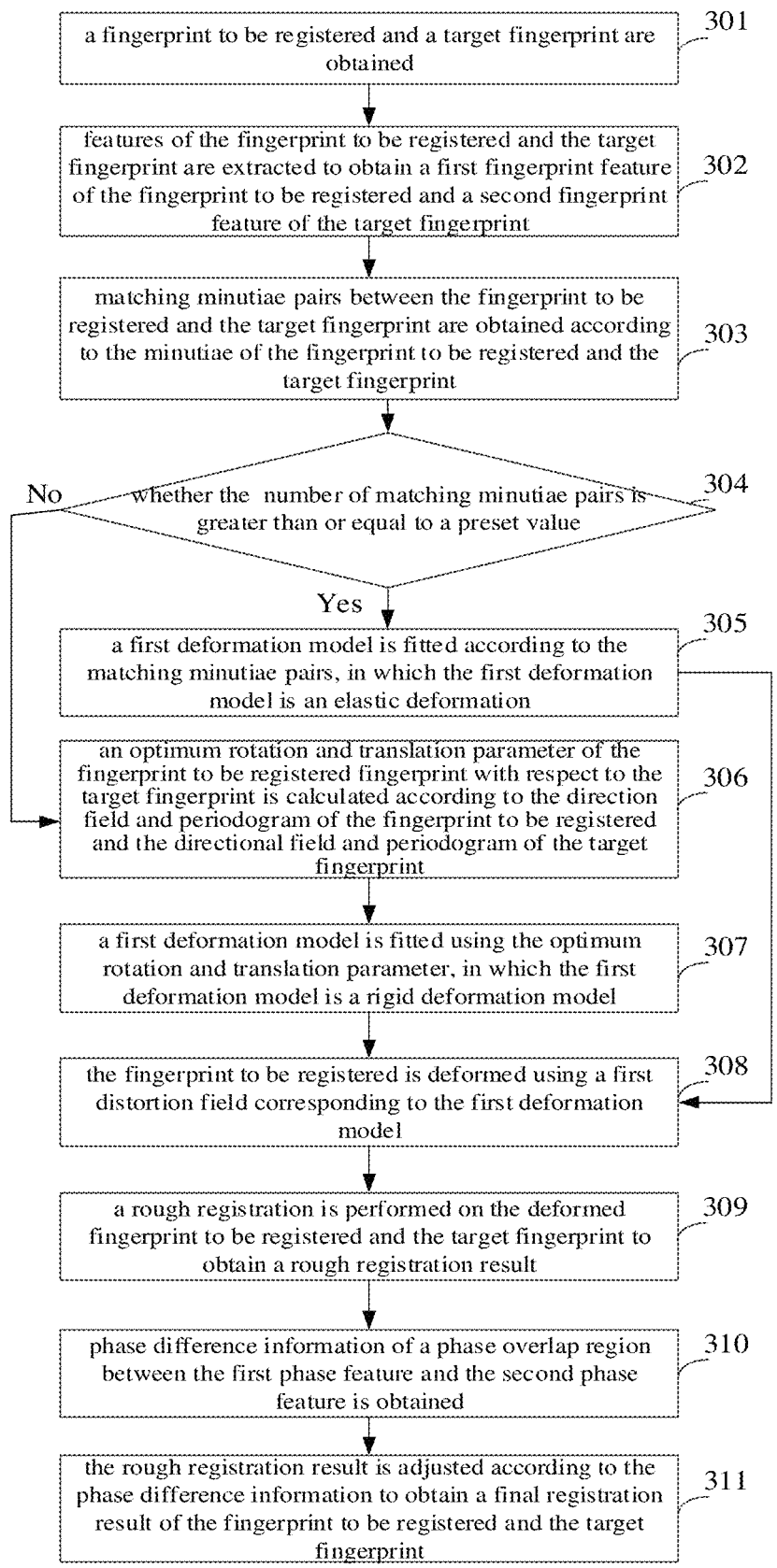
FIG. 7 is a flow chart of another fingerprint registration method according to an embodiment of the present disclosure.

FIG. 7 is a flow diagram of another fingerprint registration method according to an embodiment of the present disclosure. As illustrated in FIG. 7, the fingerprint registration method includes the following blocks.

S301, a fingerprint to be registered and a target fingerprint are obtained.

S302, features of the fingerprint to be registered and the target fingerprint are extracted to obtain a first fingerprint feature of the fingerprint to be registered and a second fingerprint feature of the target fingerprint.

The first fingerprint feature includes a first ridge feature and a first phase feature, and the second fingerprint feature includes a second ridge feature and a second phase feature.

In some embodiments, the first ridge feature includes a direction field, a periodogram and minutiae of the fingerprint to be registered, and the second ridge feature includes a direction field, a periodogram and minutiae of the target fingerprint.

S303, matching minutiae pairs between the fingerprint to be registered and the target fingerprint are obtained according to the minutiae of the fingerprint to be registered and the minutiae of the target fingerprint.

Specifically, minutiae descriptors are constructed according to the minutiae of the fingerprint to be registered in the first ridge feature and the minutiae of the target fingerprint in the second ridge feature, such as minutiae cylinder code descriptors. Further, the minutiae descriptors are matched using a matching algorithm to obtain the matching minutiae pairs. In some embodiments, the matching algorithm can be a spectral matching algorithm or a Hungarian algorithm.

S304, it is determined whether the number of matching minutiae pairs is greater than or equal to a preset value.

In some embodiments, the number of the fewest matching minutiae pairs may be preset according to a registration requirement, and the number of the fewest matching minutiae pairs is the preset value. After obtaining the matching minutiae pairs, it is required to compare the number of the matching minutiae pairs with the preset value to determine whether the number of the matching minutiae pairs is greater than or equal to the preset value. Alternatively, the number of the fewest matching pairs may be 4, that is, the preset value is 4.

When the number of the matching minutiae pairs is greater than or equal to the preset value, S305 is executed; when the number of the matching minutiae pairs is less than the preset value, S306 is executed.

S305, a first deformation model is fitted according to the matching minutiae pairs, in which the first deformation model is an elastic deformation.

After obtaining the elastic deformation model, S308 is executed sequentially.

S306, an optimum rotation and translation parameter of the fingerprint to be registered fingerprint with respect to the target fingerprint is calculated according to the direction field and the periodogram of the fingerprint to be registered and the directional field and the periodogram of the target fingerprint.

S307, a first deformation model is fitted using the optimum rotation and translation parameter, in which the first deformation model is a rigid deformation model.

S308, the fingerprint to be registered is deformed using a first distortion field corresponding to the first deformation model.

S309, a rough registration is performed on the deformed fingerprint to be registered and the target fingerprint to obtain a rough registration result.

S310, phase difference information of a phase overlap region between the first phase feature and the second phase feature is obtained.

S311, the rough registration result is adjusted according to the phase difference information to obtain a final registration result of the fingerprint to be registered and the target fingerprint.

The detailed descriptions of S309 to S311 can refer to related descriptions in the above embodiments, and descriptions thereof will be omitted.

Figure 8:
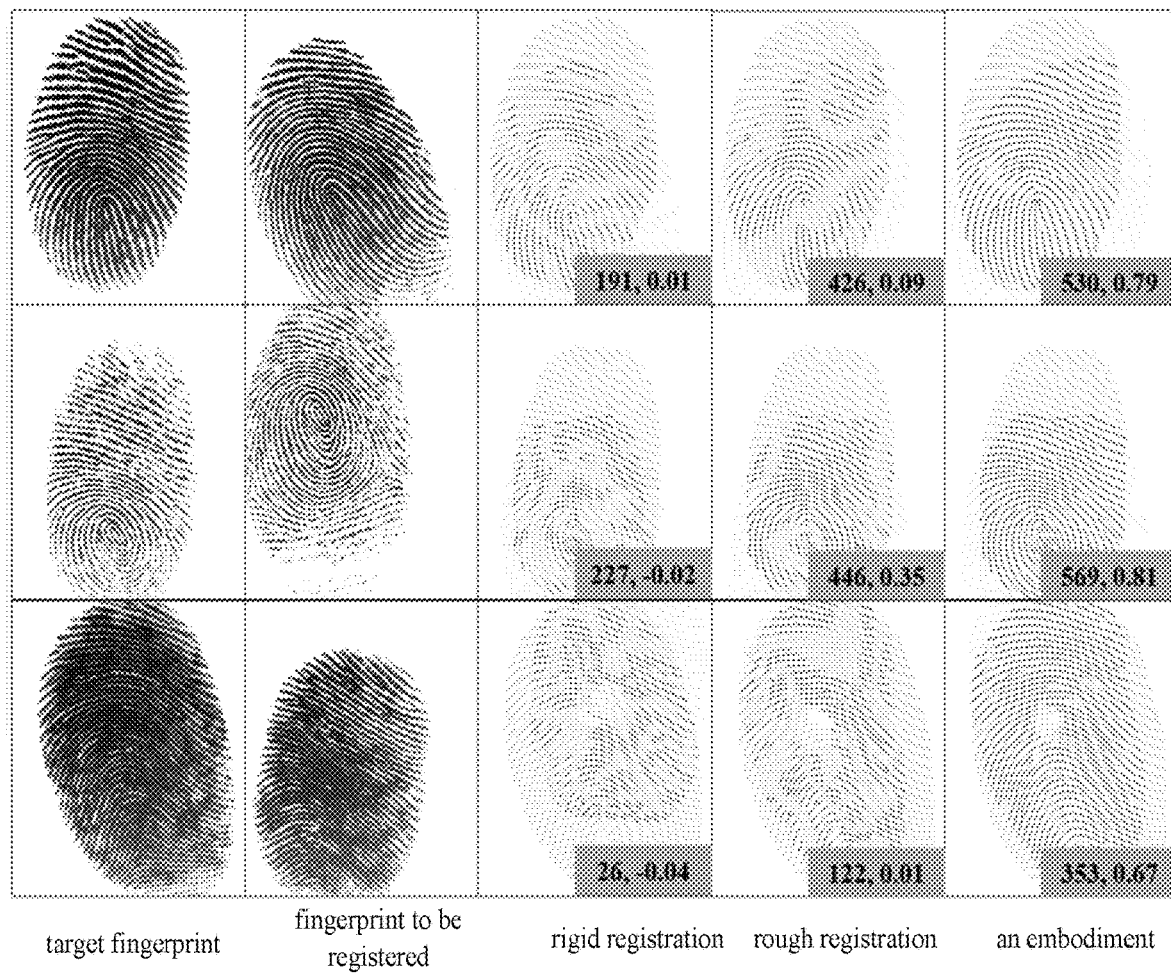
FIG. 8 is a schematic diagram of registration results of a fingerprint registration method according to an embodiment of the present disclosure and fingerprint registration methods in the related art.

FIG. 8 is a schematic diagram of registration results of a fingerprint registration method according to an embodiment of the present disclosure and fingerprint registration methods in the related art. In FIG. 8, each line is a comparison sketch of the registration result of the fingerprint to be registered and the target fingerprint. The first column is the target fingerprint, and the second column is the fingerprint to be registered. The third column is the registration result of the fingerprint to be registered and the target fingerprint after performing the rigid body transformation using the directional field, the fourth column is the registration result of the fingerprint to be registered and the target fingerprint after performing the rough registration according to an embodiment of the present disclosure, and the fifth column is the registration result of the fingerprint to be registered and the target fingerprint after performing the fine registration of the fingerprint registration method according to an embodiment of the present disclosure.

In order to display the registration result intuitively, a thinning graph of the registered fingerprint is superimposed on a binary graph of the target fingerprint, in which the thick line in the figure represents the binary graph of the target fingerprint, the fine line represents the thinning graph of the registered fingerprint, the deep black fine line represents the ridge of fine registration of the two fingerprints, and the gray fine line represents the non-registration region or non-public region of the two fingerprints. The two numbers in the bottom right corner of the diagram represent a matching score and a correlation coefficient of the registered fingerprint to be registered and the target fingerprint, respectively. As illustrated in FIG. 8, after performing the registration of the fingerprint registration method according to an embodiment of the present disclosure, the minutiae and all ridges of the fingerprint to be registered and the target fingerprint can be aligned in the overlap region. In addition, the matching score and the correlation coefficient of fingerprint registration are greatly improved compared with the rigid registration and the rough registration.

In some embodiments, it does not simply depend on the ridge feature to perform the fingerprint registration and add the phase feature on the basis of the ridge feature, and perform twice registration, thereby improving the accuracy of fingerprint registration.

Figure 9:
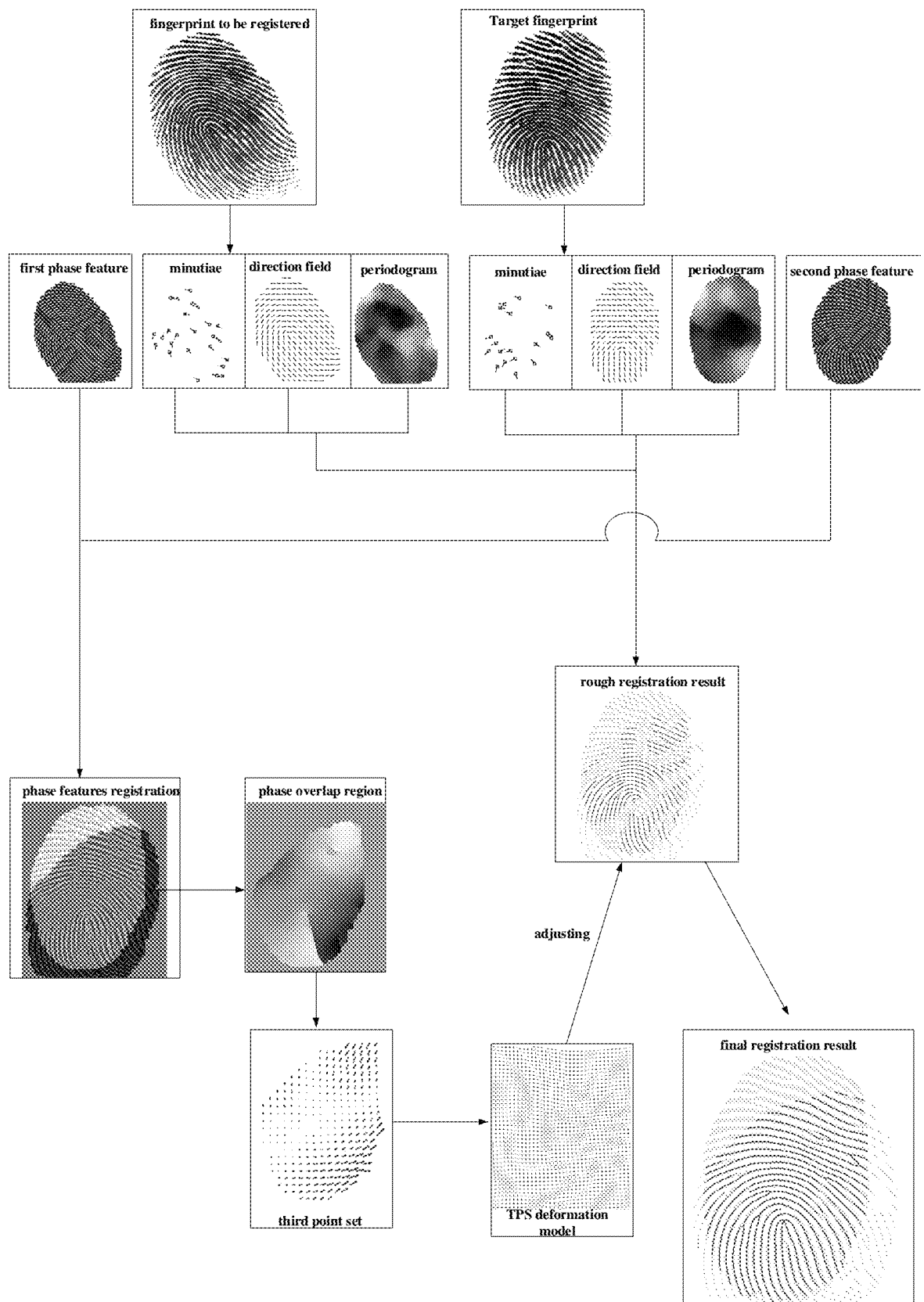
FIG. 9 is a schematic diagram of an application of a fingerprint registration method according to an embodiment of the present disclosure.

FIG. 9 is a schematic diagram of an application of a fingerprint registration method according to an embodiment of the present disclosure. FIG. 9 illustrates the fingerprint registration method according to an embodiment of the present disclosure in the form of images. The fingerprint to be registered and the target fingerprint are obtained first, and then features of the two fingerprints are extracted to obtain fingerprint features of the two fingerprints, that is, the first fingerprint feature of the fingerprint to be registered and the second fingerprint feature of the target fingerprint. The first fingerprint feature includes a direction field, a periodogram, minutiae and a first phase feature of the fingerprint to be registered, and the second fingerprint feature includes a direction field, a periodogram, minutiae and a second phase feature of the target fingerprint.

Further, a rough registration is performed according to the direction field, the periodogram and the minutiae of the fingerprint to be registered and the direction field, the periodogram and the minutiae of the target fingerprint to obtain the rough registration result. Further, the rough registration is performed on the first phase feature of the fingerprint to be registered and the second phase feature of the target fingerprint to obtain the rough registration result of phase features of the two fingerprints, and then the phase overlap region of the two fingerprints is obtained using the phase unwrapping method. Further, the third point set of the fingerprint to be registered in the phase overlap region can be obtained, the fourth point set of the target fingerprint can be determined according to the third point set, and then a thin plate spline model can be fitted. The rough registration result is adjusted according to the thin plate spline model to obtain the final registration result of the fingerprint to be registered and the target fingerprint.

Figure 10:
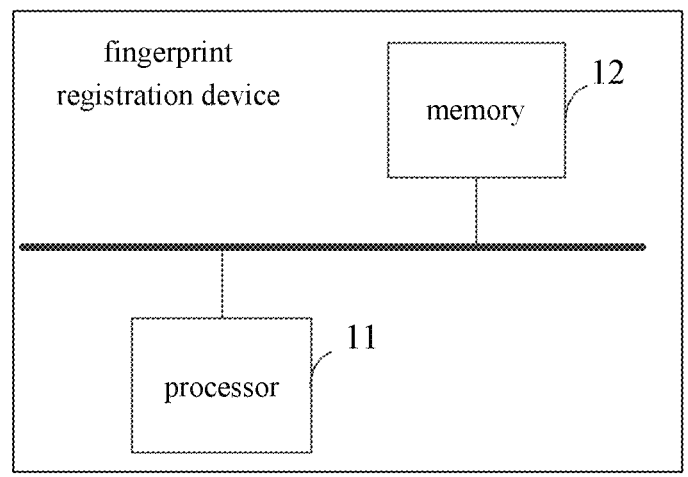
FIG. 10 is a block diagram of a fingerprint registration device according to an embodiment of the present disclosure.

FIG. 10 is a block diagram of a fingerprint registration device according to an embodiment of the present disclosure. As illustrated in FIG. 10, the fingerprint registration device includes a processor 11 and a memory 12.

The processor 11 is configured to: obtain a fingerprint to be registered and a target fingerprint, extract features from the fingerprint to be registered and the target fingerprint to obtain a first fingerprint feature of the fingerprint to be registered and a second fingerprint feature of the target fingerprint, perform a rough registration on the fingerprint to be registered and the target fingerprint according to the first ridge feature and the second ridge feature to obtain a rough registration result, obtain phase difference information of a phase overlap region between the first phase feature and the second phase feature, and adjust the rough registration result according to the phase difference information to obtain a final registration result of the fingerprint to be registered and the target fingerprint. The first fingerprint feature includes a first ridge feature and a first phase feature; and the second fingerprint feature includes a second ridge feature and a second phase feature.

Further, the processor 11 is specifically configured to fit a first deformation model of the fingerprint to be registered with respect to the target fingerprint according to the first ridge feature and the second ridge feature, deform the fingerprint to be registered according to a first distortion field corresponding to the first deformation model to obtain a deformed fingerprint to be registered, and perform the rough registration on the deformed fingerprint to be registered and the target fingerprint to obtain the rough registration result.

Further, when the ridge feature of fingerprint includes a direction field of fingerprint and a periodogram of fingerprint, the first deformation model is a rigid deformation model.

Further, when the ridge feature of fingerprint includes a direction field of fingerprint, a periodogram of fingerprint and minutiae of fingerprint, the processor 11 is specifically configured to obtain matching minutiae pairs between the fingerprint to be registered and the target fingerprint according to the minutiae of fingerprint in the first ridge feature and the minutiae of fingerprint in the second ridge feature, and fit the first deformation model according to the matching minutiae pairs when a number of the matching minutiae pairs is greater than or equal to a preset value, in which the first deformation model is an elastic deformation model.

Further, the processor 11 is specifically configured to construct minutiae descriptors according to the minutiae of the fingerprint to be registered in the first ridge feature and the minutiae of the target fingerprint in the second ridge feature, and match the minutiae descriptors using a matching algorithm to obtain the matching minutiae pairs.

Further, the processor 11 is further configured to calculate an optimum rotation and translation parameter of the fingerprint to be registered with respect to the target fingerprint according to the direction field of the fingerprint to be registered and the periodogram of the fingerprint to be registered in the first ridge feature and the direction field of the target fingerprint and the periodogram of the target fingerprint in the second ridge feature when the number of the matching minutiae pairs is less than the preset value, and fit the first deformation model using the optimum rotation and translation parameter, in which the first deformation model is a rigid deformation model.

Further, the processor 11 is specifically configured to deform the first phase feature using the first deformation model, perform a registration on the deformed first phase feature and the second phase feature to obtain the phase overlap region between the first phase feature and the second phase feature, perform a subtraction on the first phase feature and the second phase feature of the phase overlap region directly to obtain an original phase difference of the phase overlap region, and apply a phase unwrapping to the original phase difference of the phase overlap region to obtain the phase difference information of the phase overlap region.

Further, the processor 11 is specifically configured to deform the first phase feature using the first deformation model, apply a phase unwrapping to the deformed first phase feature and the second phase feature respectively to obtain a third phase feature and a fourth phase feature, perform a registration on the third phase feature and the fourth phase feature to obtain a phase overlap region between the third phase feature and the fourth phase feature, and perform a subtraction on the third phase feature and the fourth phase feature of the phase overlap region to obtain the phase difference information between the third phase feature and the fourth phase feature.

Further, the processor 11 is specifically configured to calculate a second deformation model of the fingerprint to be registered with respect to the target fingerprint according to the phase difference information, and deform the fingerprint to be registered in the rough registration result according to a second distortion field corresponding to the second deformation model to obtain the final registration result.

Further, the processor 11 is specifically configured to obtain a deformation vector of a first point set of the fingerprint to be registered with respect to a second point set of the target fingerprint in the phase overlap region according to the phase difference information, the direction field of the target fingerprint and the periodogram of the target fingerprint in the second ridge feature, filter noise points in the first point set according to the first deformation vector and the second deformation vector to obtain a third point set of the fingerprint to be registered, obtain a fourth point set of the target fingerprint from the second point set according to the third point set, and perform a fitting using the third point set and the fourth point set to obtain the second deformation model. The first point set includes all pixel points of the fingerprint to be registered in the phase overlap region, and the second point set includes respective points in the target fingerprint corresponding to the first point set; the deformation vector includes a deformation strength and a deformation direction; and the deformation vector is decomposable into a first deformation vector in a horizontal direction and a second deformation vector in a vertical direction.

Further, the processor 11 is specifically configured to sample the third point set and the fourth point set according to a preset sampling interval, and perform the fitting using the sampled third point set and the sampled fourth point set to obtain the second deformation model.

Further, the deformation strength in the first deformation vector is calculated according to a formula of $$D_x(x, y) = \frac{\Delta \Phi_U(x, y)}{2\pi / P_R(x, y)} \cos\left(O_R(x, y) + \frac{\pi}{2}\right);$$

and
the deformation strength in the second deformation vector is calculated according to a formula of $$D_y(x, y) = \frac{\Delta \Phi_U(x, y)}{2\pi / P_R(x, y)} \sin\left(O_R(x, y) + \frac{\pi}{2}\right),$$

where, $D_x(x,y)$ is the deformation strength in the horizontal direction of a pixel point at position (x,y) in the first point set of the fingerprint to be registered with respect to a corresponding pixel point in the second point set;

$D_y(x,y)$ is the deformation strength in the vertical direction of a pixel point at position (x,y) in the first point set of the fingerprint to be registered with respect to a corresponding pixel point in the second point set;

$\Delta\Phi_U(x,y)$ is the phase difference information at position (x,y);

$P_R(x,y)$ is a value of the periodogram of the target fingerprint at position (x,y); and $O_R(x,y)$ is a value of the direction field of the target fingerprint at position (x,y).

Further, the processor 11 is specifically configured to input the fingerprint to be registered and the target fingerprint into a preset band pass filter respectively to obtain a first filtered fingerprint of the fingerprint to be registered and a second filtered fingerprint of the target fingerprint, and apply a four quadrant arc tangent operation to the first filtered fingerprint and the second filtered fingerprint to obtain the first phase feature and the second phase feature.

Alternatively, the band pass filter is a complex Gabor filter.

The processor 11 is connected to and communicates with the memory 12 through a bus. The bus can be an Industrial Standard Architecture (ISA for short) bus, a Peripheral Component (PCI for short) bus, an Extended Industry Standard Architecture (EISA for short) bus or the like. There may be an address bus, a data bus and a control bus and the like. To convenient representation, it only uses a bold line to represent the bus in FIG. 10, but it does not mean only one bus or one type of bus.

The processor 11 can be a central processing unit (CPU for short), or an application specific integrated circuit (ASIC for short), or one or more integrated circuits configured as embodiments of the present disclosure.

With the fingerprint registration device according to an embodiment of present disclosure, the rough registration is performed according to the ridge features of the fingerprint to be registered and the target fingerprint, the phase difference information of the two fingerprints is obtained using the phase features of the two fingerprints, and then the rough registration result is adjusted according to the phase difference information to obtain the final registration result of the two fingerprints. In some embodiments, it does not simply depend on the ridge feature to perform the fingerprint registration and add the phase feature on the basis of the ridge feature, and perform twice registration, thereby improving the accuracy of fingerprint registration.

Figure 11:
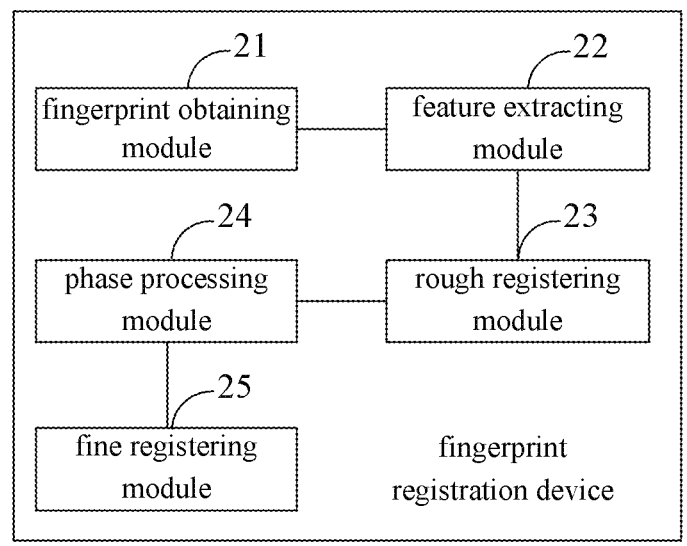
FIG. 11 is a block diagram of another fingerprint registration device according to an embodiment of the present disclosure.

FIG. 11 is a block diagram of another fingerprint registration device according to an embodiment of the present disclosure. As illustrated in FIG. 11, the fingerprint registration device includes a fingerprint obtaining module 21, a feature extracting module 22, a rough registering module 23, a phase processing module 24 and a fine registering module 25.

Specifically, the fingerprint obtaining module 21 is configured to obtain a fingerprint to be registered and a target fingerprint.

The feature extracting module 22 is configured to extract features from the fingerprint to be registered and the target fingerprint to obtain a first fingerprint feature of the fingerprint to be registered and a second fingerprint feature of the target fingerprint. The first fingerprint feature includes a first ridge feature and a first phase feature, and the second fingerprint feature includes a second ridge feature and a second phase feature.

The rough registering module 23 is configured to perform a rough registration on the fingerprint to be registered and the target fingerprint according to the first ridge feature and the second ridge feature to obtain a rough registration result.

The phase processing module 24 is configured to obtain phase difference information of a phase overlap region between the first phase feature and the second phase feature.

The fine registering module 25 is configured to adjust the rough registration result according to the phase difference information to obtain a final registration result of the fingerprint to be registered and the target fingerprint.

Further, the rough registering module 23 is specifically configured to fit a first deformation model of the fingerprint to be registered with respect to the target fingerprint according to the first ridge feature and the second ridge feature, deform the fingerprint to be registered according to a first distortion field corresponding to the first deformation model to obtain a deformed fingerprint to be registered, and perform the rough registration on the deformed fingerprint to be registered and the target fingerprint to obtain the rough registration result.

Further, when the ridge feature of fingerprint includes a direction field of fingerprint and a periodogram of fingerprint, the first deformation model is a rigid deformation model.

Further, when the ridge feature of fingerprint includes a direction field of fingerprint, a periodogram of fingerprint and minutiae of fingerprint, the rough registering module 23 is specifically configured to obtain matching minutiae pairs between the fingerprint to be registered and the target fingerprint according to the minutiae of fingerprint in the first ridge feature and the minutiae of fingerprint in the second ridge feature, and fit the first deformation model according to the matching minutiae pairs when a number of the matching minutiae pairs is greater than or equal to a preset value, in which the first deformation model is an elastic deformation model. Further, the rough registering module 23 is specifically configured to construct minutiae descriptors according to the minutiae of the fingerprint to be registered in the first ridge feature and the minutiae of the target fingerprint in the second ridge feature, and match the minutiae descriptors using a matching algorithm to obtain the matching minutiae pairs.

Further, the rough registering module 23 is further configured to calculate an optimum rotation and translation parameter of the fingerprint to be registered with respect to the target fingerprint according to the direction field of the fingerprint to be registered and the periodogram of the fingerprint to be registered in the first ridge feature and the direction field of the target fingerprint and the periodogram of the target fingerprint in the second ridge feature when the number of the matching minutiae pairs is less than the preset value, and fit the first deformation model using the optimum rotation and translation parameter, in which the first deformation model is a rigid deformation model.

Further, the phase processing module 24 is specifically configured to deform the first phase feature using the first deformation model, perform a registration on the deformed first phase feature and the second phase feature to obtain the phase overlap region between the first phase feature and the second phase feature, perform a subtraction on the first phase feature and the second phase feature of the phase overlap region directly to obtain an original phase difference of the phase overlap region, and apply a phase unwrapping to the original phase difference of the phase overlap region to obtain the phase difference information of the phase overlap region.

Further, the phase processing module 24 is specifically configured to deform the first phase feature using the first deformation model, apply a phase unwrapping to the deformed first phase feature and the second phase feature respectively to obtain a third phase feature and a fourth phase feature, perform a registration on the third phase feature and the fourth phase feature to obtain a phase overlap region between the third phase feature and the fourth phase feature, and perform a subtraction on the third phase feature and the fourth phase feature of the phase overlap region to obtain the phase difference information between the third phase feature and the fourth phase feature.

Further, the fine registering module 25 is specifically configured to calculate a second deformation model of the fingerprint to be registered with respect to the target fingerprint according to the phase difference information, and deform the fingerprint to be registered in the rough registration result according to a second distortion field corresponding to the second deformation model to obtain a final registration result.

Further, the fine registering module 25 is specifically configured to obtain a deformation vector of a first point set of the fingerprint to be registered with respect to a second point set of the target fingerprint in the phase overlap region according to the phase difference information, the direction field of the target fingerprint and the periodogram of the target fingerprint in the second ridge feature, filter noise points in the first point set according to the first deformation vector and the second deformation vector to obtain a third point set of the fingerprint to be registered, obtain a fourth point set of the target fingerprint from the second point set according to the third point set, and perform a fitting using the third point set and the fourth point set to obtain the second deformation model. The first point set includes all pixel points of the fingerprint to be registered in the phase overlap region, and the second point set includes respective points in the target fingerprint corresponding to the first point set; the deformation vector includes a deformation strength and a deformation direction; and the deformation vector is decomposable into a first deformation vector in a horizontal direction and a second deformation vector in a vertical direction.

Further, the fine registering module 25 is specifically configured to sample the third point set and the fourth point set according to a preset sampling interval, and perform the fitting using the sampled third point set and the sampled fourth point set to obtain the second deformation model.

Further, the deformation strength in the first deformation vector is calculated according to a formula of $$D_x(x,y) = \frac{\Delta\Phi_U(x,y)}{2\pi/P_R(x,y)}\cos\left(O_R(x,y) + \frac{\pi}{2}\right);$$

and
the deformation strength in the second deformation vector is calculated according to a formula of $$D_y(x,y) = \frac{\Delta\Phi_U(x,y)}{2\pi/P_R(x,y)}\sin\left(O_R(x,y) + \frac{\pi}{2}\right),$$

where, $D_x(x,y)$ is the deformation strength in the horizontal direction of a pixel point at position (x,y) in the first point set of the fingerprint to be registered with respect to a corresponding pixel point in the second point set;

$D_y(x,y)$ is the deformation strength in the vertical direction of a pixel point at position (x,y) in the first point set of the fingerprint to be registered with respect to a corresponding pixel point in the second point set;

$\Delta\Phi_U(x,y)$ is the phase difference information at position (x,y);

$P_R(x,y)$ is a value of the periodogram of the target fingerprint at position (x,y); and $O_R(x,y)$ is a value of the direction field of the target fingerprint at position (x,y).

Further, the feature extracting module 22 is specifically configured to input the fingerprint to be registered and the target fingerprint into a preset band pass filter respectively to obtain a first filtered fingerprint of the fingerprint to be registered and a second filtered fingerprint of the target fingerprint, and apply a four quadrant arc tangent operation to the first filtered fingerprint and the second filtered fingerprint to obtain the first phase feature and the second phase feature. Alternatively, the band pass filter is a complex Gabor filter.

With the fingerprint registration device according to an embodiment of present disclosure, the rough registration is performed according to the ridge features of the fingerprint to be registered and the target fingerprint, the phase difference information of the two fingerprints is obtained using the phase features of the two fingerprints, and then the rough registration result is adjusted according to the phase difference information to obtain the final registration result of the two fingerprints. In some embodiments, it does not simply depend on the ridge feature to perform the fingerprint registration and add the phase feature on the basis of the ridge feature, and perform twice registration, thereby improving the accuracy of fingerprint registration.

According to the above embodiments, the present disclosure provides a non-transitory computer readable storage medium, configured to store executable program codes, and the executable program codes are configured to execute the fingerprint registration method according to any embodiments of the present disclosure.

Further, the present disclosure provides a computer program product, configured to execute the fingerprint registration method according to any embodiments of the present disclosure.

The technical solutions of embodiments of the present disclosure can be embodied in the form of computer software products in essence or in the part of contribution to the prior art. The computer software products are stored in a storage medium (such as ROM/RAM, disk or CD), and the storage medium includes a number of instructions configured to execute part or all blocks of the fingerprint registration method described in FIGS. 1 to 6 and FIG. 7 of embodiments of the present disclosure.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. In the present specification, the appearances of the above terms are not necessarily referring to the same embodiment or example of the present disclosure. Furthermore, the particular features, structures, materials, or characteristics may be combined in any suitable manner in one or more embodiments or examples. In addition, under non-contradictory circumstances, various embodiments or examples as well as features of various embodiments or examples described in the present specification can be combined by those skilled in the art.

In addition, terms such as "first" and "second" are used herein for the purpose of description and are not intended to indicate or imply relative importance or significance or to imply the number of indicated technical features. Thus, the feature defined with "first" and "second" may include one or more of this feature. In descriptions of the present disclosure, "a plurality of" means at least two, such as two or three, unless specified otherwise.

Any process or method described in the flowing diagram or other means may be understood as a module, segment or portion including one or more executable instruction codes of the procedures configured to achieve a certain logic function or process, and the preferred embodiments of the present disclosure include other performances, in which the performances may be achieved in other orders instead of the order illustrated or discussed, such as in an almost simultaneous way or in an opposite order, which should be appreciated by those having ordinary skills in the art to which embodiments of the present disclosure belong.

The logic and/or procedures indicated in the flowing diagram or described in other means herein, such as a constant sequence table of the executable code for performing a logical function, may be implemented in any computer readable storage medium so as to be adopted by the code execution system, the device or the equipment (such a system based on the computer, a system including a processor or other systems fetching codes from the code execution system, the device and the equipment, and executing the codes) or to be combined with the code execution system, the device or the equipment to be used. With respect to the description of the present invention, "the computer readable storage medium" may include any device including, storing, communicating, propagating or transmitting program so as to be used by the code execution system, the device and the equipment or to be combined with the code execution system, the device or the equipment to be used. The computer readable medium includes specific examples (a non-exhaustive list): the connecting portion (electronic device) having one or more arrangements of wire, the portable computer disc cartridge (a magnetic device), the random access memory (RAM), the read only memory (ROM), the electrically programmable read only memory (EPROMM or the flash memory), the optical fiber device and the compact disk read only memory (CDROM). In addition, the computer readable storage medium even may be papers or other proper medium printed with program, as the papers or the proper medium may be optically scanned, then edited, interpreted or treated in other ways if necessary to obtain the program electronically which may be stored in the computer memory.

It should be understood that, each part of the present invention may be implemented by the hardware, software, firmware or the combination thereof. In the above embodiments of the present invention, the plurality of procedures or methods may be implemented by the software or hardware stored in the computer memory and executed by the proper code execution system. For example, if the plurality of procedures or methods are to be implemented by the hardware, like in another embodiment of the present invention, any one of the following known technologies or the combination thereof may be used, such as discrete logic circuits having logic gates for implementing various logic functions upon an application of one or more data signals, application specific integrated circuits having appropriate logic gates, programmable gate arrays (PGA), field programmable gate arrays (FPGA).

It can be understood by those having the ordinary skills in the related art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The computer readable storage medium may be read-only memories, magnetic disks, or optical disks. Although explanatory embodiments have been illustrated and described, it would be appreciated by those skilled in the art that the above embodiments cannot be construed to limit the present disclosure, and changes, alternatives, and modifications may be made in the embodiments without departing from spirit, principles and scope of the present disclosure.

It should be understood that the above disclosure are only part embodiments of the present disclosure, and cannot be used to limit rights scope of the present disclosure, therefore, any equivalent changes to claims of the present disclosure are within the scope of the present disclosure.

What is claimed is:

1. A fingerprint registration method, comprising:
   obtaining a fingerprint to be registered and a target fingerprint;
   extracting features from the fingerprint to be registered and the target fingerprint to obtain a first fingerprint feature of the fingerprint to be registered and a second fingerprint feature of the target fingerprint, wherein the first fingerprint feature comprises a first ridge feature and a first phase feature; the second fingerprint feature comprises a second ridge feature and a second phase feature;
   performing a initial registration on the fingerprint to be registered and the target fingerprint according to the first ridge feature and the second ridge feature to obtain a initial registration result;
   obtaining phase difference information of a phase overlap region between the first phase feature and the second phase feature; and
   adjusting the initial registration result according to the phase difference information to obtain a final registration result of the fingerprint to be registered and the target fingerprint.

2. The fingerprint registration method according to claim 1, wherein performing a initial registration on the fingerprint to be registered and the target fingerprint according to the first ridge feature and the second ridge feature to obtain a initial registration result comprises:
   fitting a first deformation model of the fingerprint to be registered with respect to the target fingerprint according to the first ridge feature and the second ridge feature;
   deforming the fingerprint to be registered according to a first distortion field corresponding to the first deformation model to obtain a deformed fingerprint to be registered; and
   performing the initial registration on the deformed fingerprint to be registered and the target fingerprint to obtain the initial registration result.

3. The fingerprint registration method according to claim 2, wherein when each of the first ridge feature and the second ridge feature comprises a direction field of fingerprint and a periodogram of fingerprint, the first deformation model is a rigid deformation model.

4. The fingerprint registration method according to claim 2, wherein when each of the first ridge feature and the second ridge feature comprises a direction field of fingerprint, a periodogram of fingerprint and minutiae of fingerprint, fitting a first deformation model of the fingerprint to be registered with respect to the target fingerprint according to the first ridge feature and the second ridge feature comprises:
   obtaining matching minutiae pairs between the fingerprint to be registered and the target fingerprint according to the minutiae of fingerprint in the first ridge feature and the minutiae of fingerprint in the second ridge feature;
   when the number of the matching minutiae pairs is greater than or equal to a preset value, fitting the first deformation model according to the matching minutiae pairs, wherein the first deformation model is an elastic deformation model.

5. The fingerprint registration method according to claim 4, wherein obtaining matching minutiae pairs between the fingerprint to be registered and the target fingerprint according to the minutiae of fingerprint in the first ridge feature and the minutiae of fingerprint in the second ridge feature comprises:
   constructing minutiae descriptors according to the minutiae of the fingerprint to be registered in the first ridge feature and the minutiae of the target fingerprint in the second ridge feature; and
   matching the minutiae descriptors using a matching algorithm to obtain the matching minutiae pairs.

6. The fingerprint registration method according to claim 4, further comprising:
   when the number of the matching minutiae pairs is less than the preset value, calculating an optimum rotation and translation parameter of the fingerprint to be registered with respect to the target fingerprint according to the direction field of the fingerprint to be registered and the periodogram of the fingerprint to be registered in the first ridge feature, and the direction field of the target fingerprint and the periodogram of the target fingerprint in the second ridge feature; and
   fitting the first deformation model using the optimum rotation and translation parameter, wherein the first deformation model is a rigid deformation model.

7. The fingerprint registration method according to claim 2, wherein obtaining phase difference information of the first phase feature with respect to the second phase feature comprises:
   deforming the first phase feature using the first deformation model;
   performing a registration on the deformed first phase feature and the second phase feature to obtain the phase overlap region between the first phase feature and the second phase feature;
   performing a subtraction on the first phase feature and the second phase feature of the phase overlap region directly to obtain an original phase difference of the phase overlap region; and
   applying a phase unwrapping to the original phase difference of the phase overlap region to obtain the phase difference information of the phase overlap region.

8. The fingerprint registration method according to claim 2, wherein obtaining phase difference information of the phase overlap region between the first phase feature and the second phase feature comprises:
   deforming the first phase feature using the first deformation model;
   applying a phase unwrapping to the deformed first phase feature and the second phase feature respectively to obtain a third phase feature and a fourth phase feature;
   performing a registration on the third phase feature and the fourth phase feature to obtain a phase overlap region between the third phase feature and the fourth phase feature; and
   performing a subtraction on the third phase feature and the fourth phase feature of the phase overlap region to obtain the phase difference information between the third phase feature and the fourth phase feature.

9. The fingerprint registration method according to claim 3, wherein adjusting the initial registration result according to the phase difference information to obtain a final registration result of the fingerprint to be registered and the target fingerprint comprises:
  calculating a second deformation model of the fingerprint to be registered with respect to the target fingerprint according to the phase difference information; and
  deforming the fingerprint to be registered in the initial registration result according to a second distortion field corresponding to the second deformation model to obtain the final registration result.

10. The fingerprint registration method according to claim 9, wherein calculating a second deformation model of the fingerprint to be registered with respect to the target fingerprint according to the phase difference information comprises:
  obtaining a deformation vector of a first point set of the fingerprint to be registered with respect to a second point set of the target fingerprint in the phase overlap region according to the phase difference information, the direction field of the target fingerprint and the periodogram of the target fingerprint in the second ridge feature, wherein the first point set comprises all pixel points of the fingerprint to be registered in the phase overlap region, the second point set comprises respective points in the target fingerprint corresponding to the first point set; the deformation vector comprises a deformation strength and a deformation direction; and the deformation vector is decomposable into a first deformation vector in a horizontal direction and a second deformation vector in a vertical direction;
  filtering noise points in the first point set according to the first deformation vector and the second deformation vector to obtain a third point set of the fingerprint to be registered;
  obtaining a fourth point set of the target fingerprint from the second point set according to the third point set; and
  performing a fitting using the third point set and the fourth point set to obtain the second deformation model.

11. The fingerprint registration method according to claim 10, wherein performing a fitting using the third point set and the fourth point set to obtain the second deformation model comprises:
  sampling the third point set and the fourth point set according to a preset sampling interval; and
  performing the fitting using the sampled third point set and the sampled fourth point set to obtain the second deformation model.

12. The fingerprint registration method according to claim 10, wherein the deformation strength in the first deformation vector is calculated according to a formula of $$D_x(x, y) = \frac{\Delta \Phi_U(x, y)}{2\pi / P_R(x, y)} \cos\left(O_R(x, y) + \frac{\pi}{2}\right);$$

the deformation strength in the second deformation vector is calculated according to a formula of $$D_y(x, y) = \frac{\Delta \Phi_U(x, y)}{2\pi / P_R(x, y)} \sin\left(O_R(x, y) + \frac{\pi}{2}\right);$$

where, $D_x(x,y)$ is the deformation strength in the horizontal direction of a pixel point at position (x,y) in the first point set of the fingerprint to be registered with respect to a corresponding pixel point in the second point set;
$D_y(x,y)$ is the deformation strength in the vertical direction of a pixel point at position (x,y) in the first point set of the fingerprint to be registered with respect to a corresponding pixel point in the second point set;
$\Delta \Phi_U(x,y)$ is the phase difference information at position (x,y);
$P_R(x,y)$ is a value of the periodogram of the target fingerprint at position (x,y); and
$O_R(x,y)$ is a value of the direction field of the target fingerprint at position (x,y).

13. The fingerprint registration method according to claim 1, further comprising:
  inputting the fingerprint to be registered and the target fingerprint into a preset band pass filter respectively to obtain a first filtered fingerprint of the fingerprint to be registered and a second filtered fingerprint of the target fingerprint; and
  applying a four quadrant arc tangent operation to the first filtered fingerprint and the second filtered fingerprint to obtain the first phase feature and the second phase feature.

14. The fingerprint registration method according to claim 13, wherein the band pass filter is a complex Gabor filter.

15. A fingerprint registration device, comprising:
  a memory, a processor, and a program stored in the memory and executable by the processor, wherein the processor is configured to perform the fingerprint registration method and the method comprises:
  obtaining a fingerprint to be registered and a target fingerprint;
  extracting features from the fingerprint to be registered and the target fingerprint to obtain a first fingerprint feature of the fingerprint to be registered and a second fingerprint feature of the target fingerprint, wherein the first fingerprint feature comprises a first ridge feature and a first phase feature; the second fingerprint feature comprises a second ridge feature and a second phase feature;
  performing a initial registration on the fingerprint to be registered and the target fingerprint according to the first ridge feature and the second ridge feature to obtain a initial registration result;
  obtaining phase difference information of a phase overlap region between the first phase feature and the second phase feature; and
  adjusting the initial registration result according to the phase difference information to obtain a final registration result of the fingerprint to be registered and the target fingerprint.

16. A non-transitory computer readable storage medium, configured to store executable program codes, wherein the executable program codes are configured to execute the fingerprint registration method and the method comprises:
  obtaining a fingerprint to be registered and a target fingerprint;
  extracting features from the fingerprint to be registered and the target fingerprint to obtain a first fingerprint feature of the fingerprint to be registered and a second fingerprint feature of the target fingerprint, wherein the first fingerprint feature comprises a first ridge feature and a first phase feature; the second fingerprint feature comprises a second ridge feature and a second phase feature;

performing a initial registration on the fingerprint to be registered and the target fingerprint according to the first ridge feature and the second ridge feature to obtain a initial registration result;

obtaining phase difference information of a phase overlap region between the first phase feature and the second phase feature; and adjusting the initial registration result according to the phase difference information to obtain a final registration result of the fingerprint to be registered and the target fingerprint.

* * * * *